United States Patent
Agari

[19]

[11] Patent Number: 6,135,638
[45] Date of Patent: Oct. 24, 2000

[54] LINEAR MOTION GUIDE UNIT WITH LUBRICATING PLATE ASSEMBLY

[75] Inventor: Norimasa Agari, Gifu-ken, Japan

[73] Assignee: Nippon Thompson Co., Ltd., Tokyo, Japan

[21] Appl. No.: 09/348,545

[22] Filed: Jul. 7, 1999

[30] Foreign Application Priority Data

Jul. 16, 1998 [JP] Japan ................................. 10-202372

[51] Int. Cl.[7] .................................................. F16C 33/10
[52] U.S. Cl. ................................. 384/13; 384/16; 384/43
[58] Field of Search ................................. 384/12, 13, 15, 384/16, 43, 44, 45

[56] References Cited

U.S. PATENT DOCUMENTS

| | | | |
|---|---|---|---|
| 5,399,023 | 3/1995 | Winkelmann et al. | 384/13 |
| 5,492,413 | 2/1996 | Tsukada | 384/15 |
| 5,547,285 | 8/1996 | Hutzel et al. | 384/15 |
| 5,590,965 | 1/1997 | Yabe et al. | 384/15 |
| 5,678,927 | 10/1997 | Yabe et al. | 384/13 |
| 5,857,779 | 1/1999 | Tsukada et al. | 384/15 |
| 5,967,667 | 10/1999 | Yatsu | 384/13 |

FOREIGN PATENT DOCUMENTS

| | | |
|---|---|---|
| 61-237113 | 10/1987 | Japan . |
| 7-004952 | 1/1995 | Japan . |

*Primary Examiner*—Thomas R. Hannon
*Attorney, Agent, or Firm*—Browdy and Neimark

[57] ABSTRACT

A linear motion guide unit comprises a round track shaft and a slider surrounding around the track shaft for sliding movement along the track shaft. A lubricating plate assembly for self-lubrication may be simply installed in most prior linear motion guide units, with no need of modification in the basic specification of a slider. Both the lubricating plate assembly and the slider are held by a retaining ring in a radially enlarged bore in the housing of the instrument in such a manner as to be kept from falling off the bore. The lubricating plate assembly includes a case accommodating therein an end seal and a lubricant plate, which is composed of a lubricant- containing member, made of a sintered resinous component having a porous structure impregnated with lubricant. As the slider moves along the track shaft, the lubricant-containing member may apply incessantly the lubricant to the track shaft.

18 Claims, 10 Drawing Sheets

LINEAR MOTION GUIDE UNIT WITH LUBRICATING PLATE ASSEMBLY

BACKGROUND OF THE INVENTION

1. Field of the Invention

The present invention relates to a linear motion guide unit with lubricating plate assemblies, which is applicable to industrial robots, semiconductor manufacturing apparatus, precision instruments, machine tools and the like.

2. Description of the Prior Art

The linear motion guide units have conventionally incorporated in the parts or components of industrial robots, semiconductor manufacturing machines or the like, where the precise control is required for reciprocating motion. The recently remarkable development in mechatronics technology extensively requires linear motion guide units. In addition, the linear motion guide units recently became required to meet with needs of increasingly severe operating conditions. For instance, the robots for assembling are now manufactured in various types, from a large scale to a miniature in accordance with the expansion of their usage. The linear motion guide units to be incorporated in such assembling robots become required to meet with needs of maintenance-free, along with miniaturization, high precision and high speed in operation. To cope with the needs, the linear motion guide unit has required the self-lubrication of long service life on its relatively movable sliding areas.

A linear motion guide unit as shown in FIG. 21 in perspective is conventionally well known and, for example, disclosed in Japanese Patent Laid-Open No. 237113/1987. The prior linear motion guide unit is what is referred to as a ball-spline bearing and composed of a track shaft 2 of a substantially circular cross section, and a cylindrical sliding element, or a slider 1, mounted on the track shaft 2 for sliding movement. The track shaft 2 has on an outer circumferential surface thereof three lines of ridges 3 extending axially of the shaft. Raceway grooves 4 formed on the track shaft 2 are arranged in the opposite sides of the ridges 3, two grooves to each ridge. The slider 1 includes a casing 5 movable along the track shaft 2 and end caps 6 attached to the casing 5. Moreover, the casing 5 is of a hollow cylindrical member, the inner circumferential surface of which is formed with raceway grooves 7 confronting the raceway grooves 4 on the track shaft 2 to thereby define load raceways therebetween for allowing rolling elements 8 to run therethrough. Thus, the slider 1 may move on the track shaft 2 in a sliding manner by virtue of rolling elements 8 running through the load raceways. A key way 14 is formed on the outer surface of the casing 5 for mounting other appliances or the like.

The casing is provided therein with return passageways 9 extending in parallel with the associated raceway groove 7. The end caps 6 are each provided therein with claws, not shown, for scooping the rolling elements 8 out of the raceway grooves 4, 7 and turnarounds 10 to turn the rolling elements 8 for endless circulation. Mounted on the end caps 6 are end seals 11 and both the end caps 6 and the end seals 11 are mounted to the casing 5 by retaining rings 12, or cir-clips. The end seals 11 are made of core metals and rubber members of, for example, acrylonitrile-butadiene rubbers for closing clearances between the track shaft 2 and the lengthwise opposing ends of the slider 1 thereby protecting the working area in the slider 1 from dust and dirt.

The load raceways defined by the confronting raceway grooves 4, 7, non-loaded turnarounds 10 formed in the end caps 6 and non-loaded return passageways 9 formed in the casing 5, in combination, constitute endless-circulating paths for the rolling elements 8. That is to say, in practice, the rolling elements 8 may run from the raceways into any one of the lengthwise opposing turnarounds 10 in the end caps 6, then through the return passageways 9 in the casing 5 and the other of the turnarounds 10, and circulate to the raceways. Thus, the rolling-contact of the rolling elements 8 with the load raceways may help ensure the smooth movement of the slider 1 relative of the track shaft 2.

In the prior linear motion guide units, grease or lubricating oil is commonly used for lubricating the confronting raceway grooves 4, 7 and the rolling elements 8.

To lubricate the raceway grooves 4, 7 and the rolling elements 8 in the linear motion guide unit constructed as described above, grease or lubricating oil is commonly employed. In case of grease, it is applied to the raceways for the rolling elements 8 through grease nipples mounted to the end caps 6 or through an oiling hole 13 provided at the outer peripheral surface of the casing 5 so as to communicate to the return passageways 9. In contrast, lubricating oil is also to the runways through the oiling hole 13.

Nevertheless, as the linear motion guide units such as linear rolling motion guide units and ball nut and screw assemblies becomes recently more common, wide applications in various fields, they are increasingly used under unfavorable operating conditions or adverse environments, for example, where no replenishment of lubricating oil is allowed, much dirt and debris may occur and there is abnormally high in temperature or moisture. In recent years much attention has been thus given the development of the linear motion guide units having no fear of lubrication failures even under the severe operating conditions, where it is very hard to achieve the normal lubrication. Disclosed in, for example, Japanese Utility Model Laid-Open No. 4593/1995 is a ball nut and screw assembly including lubricant-containing polymer to ensure the satisfactory operation even under the unfavorable environment where it might be plagued with the difficulties of lubrication. The prior ball nut and screw assembly cited above is composed of a screw shaft having helical external grooves around the outer periphery thereof, a nut fitted loosely over the screw shaft and provided on the inner surface thereof with helical internal grooves confronting the grooves on the screw shaft, balls running through helical spaces between the confronting helical grooves, and lubricant-containing polymer members arranged so as to make slide-contact with the helical groove surfaces on the screw shaft.

The lubricant-containing polymer members in the prior ball nut and screw assembly are, however, produced by mixing poly(α-olefinic) polymer with a lubricating oil, then melting the mixture with heating in a predetermined mold, and solidifying the molten mixture by cooling. Therefore, the lubricant- containing polymer members have necessarily required the complicated and high technology as well as the high production cost. In addition, it will be understood to those skilled in the art that the technology as to the ball nut and screw assembly may not be directly applied to the linear motion guide units without any modification. It is thus expected to develop an improved lubricating means for the linear motion guide unit what is referred to as a ball-spline, which makes it possible to keep self-lubrication even under too harsh situation for lubrication.

SUMMARY OF THE INVENTION

The present invention has for its primary object to achieve the subject matter as described above, and to provide a linear motion guide unit provided with lubricating plate assemblies that may be simply installed into the presently available linear motion guide unit having a round track shaft, with applying only a little modification to the linear motion guide unit. According to the present invention, the linear motion guide unit of ball-spline type may be provided, which has the lubricating plate assemblies of self- lubrication making it possible to keep desirable lubricating conditions, thereby ensuring the linear motion guide unit an acceptable long service life, improvement in dustproof for cleaning any debris from the guide unit, maintenance-free as for lubricant replenishment and easy production.

The present invention is concerned with a linear motion guide unit comprising an elongated track shaft of solid cylinder, a slider having a casing and surrounding around the track shaft for sliding movement along the track shaft, and at least one lubricating plate assembly arranged at least any one of lengthwise opposing ends of the casing of the slider for sliding movement on the track shaft, wherein the lubricating plate assembly includes therein a lubricant plate movable along the track shaft and made of sintered resinous component having porous structure impregnated with lubricant, an end seal arranged on the lubricant plate in a side opposite to the casing so as to slide along the track shaft, and a case containing therein both the lubricant plate and the end seal.

According to the linear motion guide unit constructed as described just above, as the slider moves on the round track shaft, the lubricant plate in the lubricating plate assembly arranged on the end of the casing moves along the track shaft in a sliding manner, applying incessantly the lubricant to the track shaft. The lubricating plate assembly has a case accommodating therein the lubricant plate and the end seal, which is arranged on the lubricant plate in the side opposite to the casing for sliding movement on the track shaft to thereby eliminate the invasion of foreign matters into the slider, which might be otherwise caused as the slider moves on the track shaft. In the linear motion guide unit of the type described above, the lubricant plate releases the lubricant little by little thereby making possible the self-lubrication even under the severe operating conditions, thus resulting in achieving the maintenance-free in operation.

In another aspect of the present invention, a linear motion guide unit is provided wherein the lubricant plate is composed of a lubricant-containing member of the sintered resinous component, and a core metal fixed to the lubricant-containing member. The core metal reinforces the lubricant-containing member of sintered resinous component, which is thus protected from any external force that might otherwise cause the breakage of the lubricant-containing member.

In another aspect of the present invention, a linear motion guide unit is provided wherein rolling elements are incorporated so as to run through load raceways defined between first raceway grooves formed lengthwise on the track shaft and second raceway grooves formed in the casing, confronting the first raceway grooves.

In another aspect of the present invention, a linear motion guide unit is provided wherein the slider is provided with end caps fixed on lengthwise opposing ends of the casing, each to each end, the casing is formed therein with return passageways for the rolling elements, and the end caps are provided therein with turnarounds where the rolling elements are permitted turning around from load raceways defined between the confronting first and second raceway grooves to the return passageways and vice versa. Moreover, the casing has a retainer for holding the rolling elements for free running through the load raceways, which is arranged a clearance between the casing and the load raceway grooves. As an alternative, a clearance between the confronting casing and the retainer may provides the return passageways for the rolling elements, and the turnarounds where the rolling elements are permitted turning around between load raceways and the return passageways.

In another aspect of the present invention, a linear motion guide unit is provided wherein the lubricant plate moves along the track shaft, with keeping a slide-contact with at least the first raceway grooves on the track shaft. Moreover, the lubricant plate is composed of a lubricant-containing member and a core metal fixed to the lubricant-containing member. The lubricant-containing member is adhered to the core metal at least at local areas neighboring its portions, which are brought into slide-contact with the first raceway grooves on the track shaft.

In a further another aspect of the present invention, a linear motion guide unit is provided wherein the lubricant plate includes the lubricant-containing member that is split at angular intervals around the track shaft into sectors of the lubricant-containing member. Splitting the lubricant plate 46 makes it easy to replace any old lubricant plate sectors 47 to a new one or to load the lubricant plate on the track shaft.

In another aspect of the present invention, a linear motion guide unit is provided wherein the case of the lubricating plate assembly includes an outer peripheral wall for providing a spatial area to accommodate therein a lubricant plate and the end seal, an end wall extending radially inwardly from one margin of the outer peripheral wall so as to keep both the lubricant plate and the end seal from falling off the margin of the outer peripheral wall and also defining an aperture for the track shaft, and an holding edge provided around the other margin of the outer peripheral wall for keeping both the lubricant plate and the end seal from falling off the spatial area. The end seal is arranged on the lubricant plate in the side opposite to casing, whereas the holding edge of the case may be positioned either in the side of the casing or in the side opposite to the casing. A means cooperating with the holding edge in keeping both the lubricant plate and the end seal from falling off is of a retaining ring fitted into the case. Moreover, the case may be made of any one of metals, synthetic resins and synthetic rubber.

In another aspect of the present invention, a linear motion guide unit is provided wherein an auxiliary end seal or end plate is arranged to the end of the casing, where the lubricating plate assembly is disposed. According to the present invention, since the lubricating plate assembly includes therein the end seal, the foreign matters such as dust and dirt on the track shaft are wiped off with the end seal belonging to the lubricating plate assembly. Thus, in case where the lubricating plate assembly of this invention is incorporated with the presently available slider, the end seal equipped to the slider acts as an auxiliary end seal. In contrast, for the casing of the slider having no end seal, an end plate is arranged to the end of the casing, where the lubricating plate assembly is disposed.

In another aspect of the present invention, a linear motion guide unit is provided which is adapted to an instrument having components movable relatively of each other, in such a manner that the track shaft is attached to any one of the components of the instrument while the slider is fitted in a bore in the other component of the instrument against falling off the bore. As an alternative, both the slider and the lubricating plate assembly may be fitted in the bore in the other component of the instrument against falling off the bore.

In a further another aspect of the present invention, a linear motion guide unit is provided wherein the lubricating plate assembly is fitted in the bore near an open end of the bore and the retaining ring is engaged in a slot formed in the bore to make an engagement with the end of the case of the lubricating plate assembly whereby both the slider and the lubricating plate assembly are kept from falling off the bore. As an alternative, the lubricating plate assembly is fitted in the bore near the open end of the bore, and the retainer plate is engaged with an end face of the other component of the instrument to make an engagement with the end of the case of the lubricating plate assembly whereby both the slider and the lubricating plate assembly are kept from falling off the bore. Moreover, lubricating plate assembly is fitted in the bore near the open end of the bore, and the case is provided with a fitting flange extended radially outwardly of the case, the fitting flange being attached onto an end face of the other component of the instrument, to thereby keep both the slider and the lubricating plate assembly from falling off the bore.

According to another modification in which no lubricating plate assembly is directly fitted in the bore formed in the other component of the instrument, the lubricating plate assembly is mounted to the slider, which is in turn attached to the other component of the instrument thereby been kept from falling off the bore.

In another aspect of the present invention, a linear motion guide unit is provided wherein the sintered resinous component is fabricated by heating finely powdered synthetic resin under pressure in a design mould.

In accordance with the linear motion guide unit constructed as described above, as the slider moves relatively along the round track shaft, the lubricating plate assembly containing the lubricant plate slides in contact with the track shaft, which is thus lubricated with lubricant, which is oozing from the lubricant plate of sintered resinous component having porous structure impregnated with the lubricant. The end seal arranged on the lubricant plate in the side opposite to the casing moves in a slide-contact relation with the track shaft, thereby keeping the slider from the invasion of the foreign matters such as dirt and dust deposited on the track shaft.

In the linear motion guide unit of the present invention, the lubricant plate releases the lubricant little by little thereby making possible the self-lubrication even under the severe operating conditions, as well as the maintenance-free as for lubricant replenishment, resulting in keeping the desirable lubricating conditions with no fear of failure in lubrication, to thereby help ensure the acceptable long service life, improvement in dustproof for cleaning any debris from the guide unit and further keep the environment clean.

Moreover, the lubricating plate assemblies may be simply installed into the presently available linear motion guide unit having a round track shaft, with applying only a little modification to the linear motion guide unit. The lubricant applied incessantly little by little makes less the sliding resistance of the slider against the track shaft with the result of eliminating the occurrence of wear. Further, the lubricant plate may be prepared by impregnating the sintered resinous components of porous structure with any lubricant selected in compliance with the conditions under which the lubricant is used. On the other hand, the sintered resinous component for the lubricant plate has only to be selected in accordance with the lubricating oil employed. Consequently, changes on specifications may be admitted easily. Moreover, the sintered resinous components for the lubricant plates may be easily formed with high accuracy of finishing. This makes it possible to provide the components that are most suitable for the linear motion guide units incorporated into the precision machines.

The lubricating plate assemblies may be used incorporated in most presently available linear motion guide units with no need of changing basic specifications. Namely, the lubricating plate assemblies of this invention may be universally adapted to the various types of the linear motion guide units, which differ, for example, in size of the sliders incorporated, as long as the track shaft is identical in its standard members. Moreover, the lubricating plate assemblies may be simply attached to any slider of the linear motion guide units, which has been under operation for machining, thereby contributing to improving the self-lubrication of the linear motion guide units.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
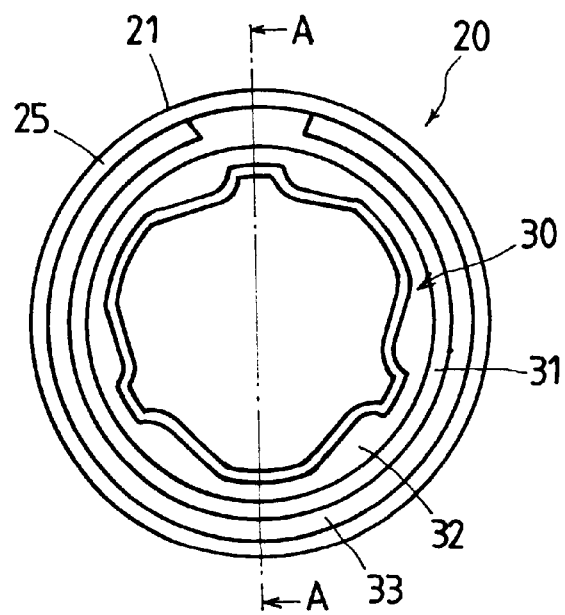
FIG. 1 is a front elevation showing a preferred embodiment of a lubricating plate assembly to be incorporated in a linear motion guide unit according to the present invention.

Referring now in detail to the drawings, the linear motion guide unit according to the present invention will be explained below. In FIGS. 1 to 9 in the accompanying drawings, similar reference characters designate similar elements or components with that of the prior linear motion guide unit shown in FIG. 20.

Figure 2:
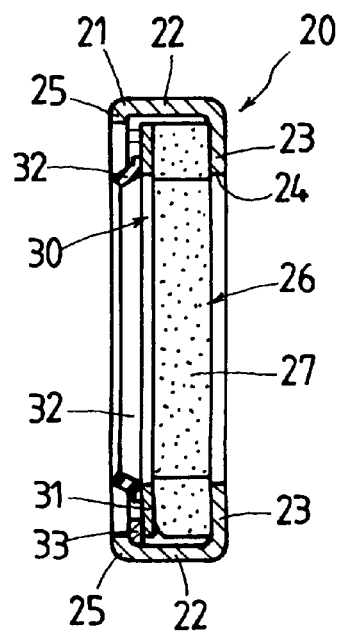
FIG. 2 is a cross section of the lubricating plate assembly shown in FIG. 1 and is taken on the plane of the line A—A of FIG. 1.
Figure 3:
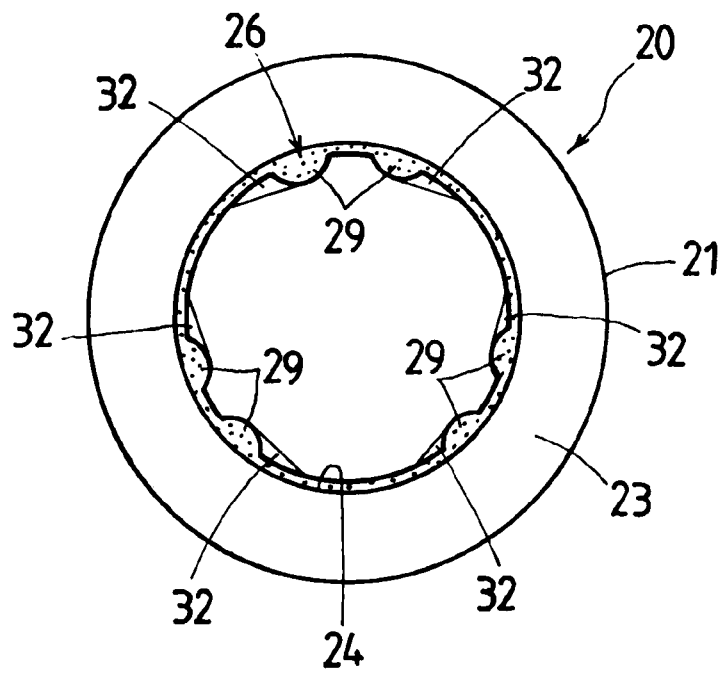
FIG. 3 is a back elevation of the lubricating plate assembly shown in FIG. 1.
Figure 21:
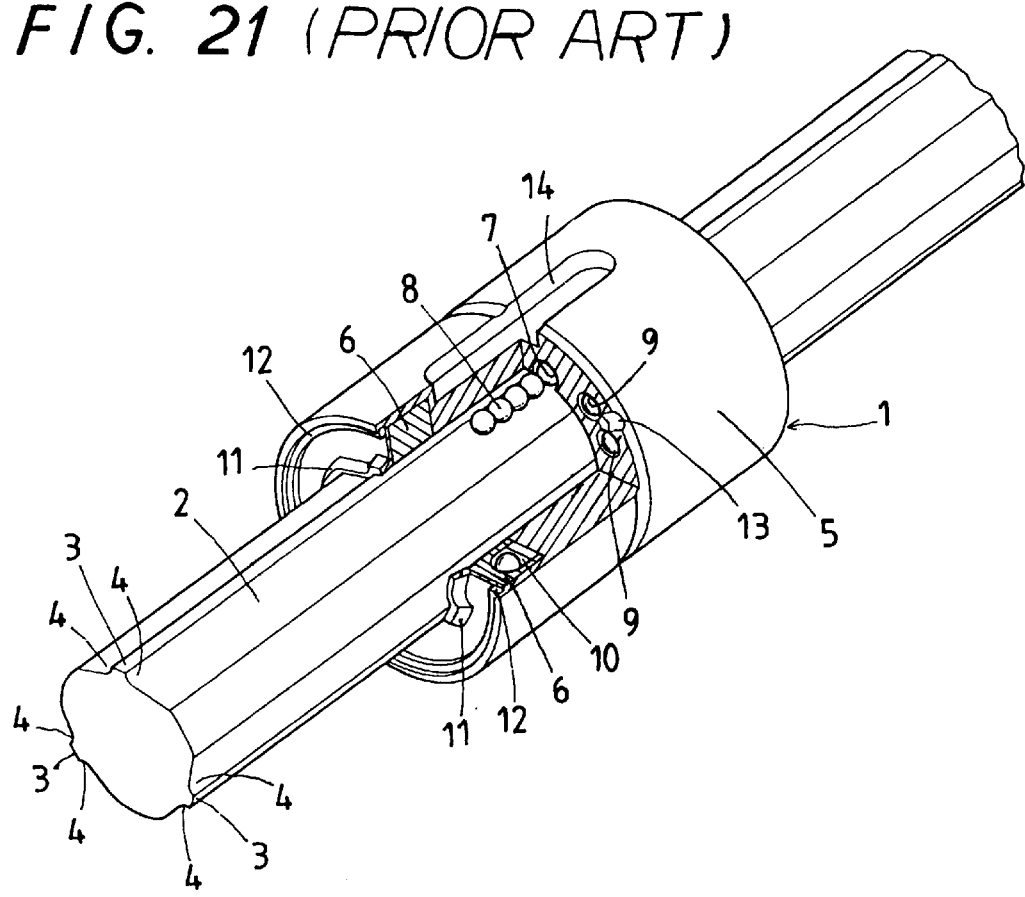
FIG. 21 is a perspective view, partially broken away, of a conventional linear motion guide unit.

A lubricating plate assembly 20 in FIGS. 1 to 3 is arranged on the end cap 6 of the linear motion guide unit as shown in FIG. 21 and thus may slide in unison with the slider 1 on the track shaft 2. The lubricating plate assembly 20 is comprised of a case 21 of a hollow cylindrical supporting member having an axial height less sufficiently compared with its diameter, a lubricant plate 26 contained in the case 21 and end seal 30. The case 21 includes an outer peripheral wall 22, an annular end wall 23 extending radially inwardly from one margin of the outer peripheral wall 22 and an annular holding edge 25 folded radially inwardly around the other margin of the outer peripheral wall 22. The annular end wall 22 defines an aperture 24, which may face unobstructively the track shaft 2. The case 21 has therein a spatial area surrounded by the outer peripheral wall 22, to accommodate therein a lubricant-containing member 27. Although the case 21 may be fabricated of any one of metals, synthetic resins, synthetic rubbers or the like, it is preferably made of thin steel plate or synthetic resins from the view point of advantages on production cost and mass production.

Figure 4:
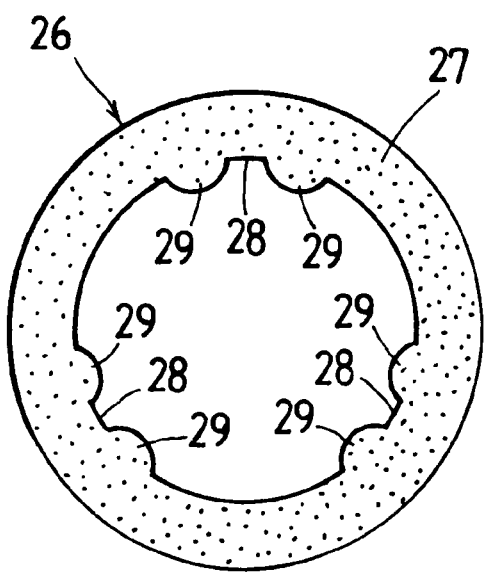
FIG. 4 is a front elevation showing an example of a lubricant plate for the lubricating plate assembly of FIG. 1.
Figure 5:
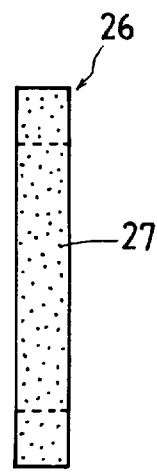
FIG. 5 is a side elevation of the lubricant plate shown in FIG. 4.

The lubricant plate 26 in the lubricating plate assembly 20, as shown in FIGS. 4 and 5 consists of the lubricant-containing member 27 of sintered resinous component having porous structure in which voids are impregnated with lubricant. The lubricant-containing member 27 is formed in an annular or ringed configuration. The annular holding edge 25 of the case 21 defines therein an opening sufficient in size to allow the lubricant-containing member 27 to pass therethrough. The annular end wall 23 of the case 21 abuts against the lubricant-containing member 27, which is thus protected from coming off the case 21. The lubricant-containing member 27 is inserted into the case 21 from the side of the annular holding edge 25 and accommodated in the spatial area defined by the outer peripheral wall 22. The lubricant-containing member 27 has on the inner periphery thereof convexities 29 raised up radially inwardly of the member 27.

The convexities 29 are arranged spaced in such a relation that any two paired convexities 29 are spaced from each other to thereby provide a recess 28 therebetween for any associated ridge 3 on the track shaft 2 and concurrently make slide-contact with the associated raceway grooves 4 in the opposite side of the recess 28, each convex to each raceway groove.

Although the lubricant-containing member 27 may be brought into sliding engagement with the track shaft 2 over the entire inner surface of the lubricant-containing member 27, the engagement at only the raceway grooves 4 is sufficient in accordance with the operating conditions from the view point of reducing the lubricant consumption. As apparent from FIG. 3, the inner periphery of the lubricant-containing member 27 is made somewhat less in diameter than the inner periphery of the aperture 24 in the end wall 23 of the case 21, so that the crests of the convexities 29 are positioned more radially inwardly, compared with the inner periphery of the aperture 24 in the end wall 23 of the case 21. Thus, the lubricant-containing member 27 helps ensure the reliable lubrication of the raceway grooves 4 through the convexities 29, which supply incessantly the lubricant or lubricating oil having soaked into the sintered resinous component.

Any lubricant-containing member 27 is composed of a sintered resinous component, which is fabricated by heating finely powdered synthetic resin under high pressure in a mould. The sintered resinous component for the lubricant-containing member 27 is of a porous structure including therein continuous voids, which is produced, for example, by filling a preselected mould with the powdery ultrahigh molecular weight polyethylene resin having the grading of 30 $\mu$m in fine grain size and from 250 $\mu$m to 300 $\mu$m in coarse grain size, and then heating the molded resin under high pressure. The sintered resinous component for the lubricant-containing member 27 preferably has the porous structure of the porosity of, for example, from 40% to 50%. The lubricant-containing member 11 is prepared by immersing the sintered porous resin component with turbine oil for the lubricating oil thereby impregnating the voids with the lubricating oil. Dipping the sintered resinous component into, for example, turbine oil for about 30 minutes may provide the lubricant-containing member 27 that is regulated at percentage of lubricating oil content of 41% by weight and thus at oil content of about 2 cc. Percentage of lubricating oil content may be controlled in accordance with the operating condition of the slider 1.

An end seal 30 is arranged in the side of the annular holding edge 25 on the lubricant-containing member 27 contained in the case 21. The end seal 30 is composed of a core metal 31 to be abutted against the lubricant-containing member 27, and rubber-made lips 32 attached to the core metal 31, facing the opening surrounded with the annular holding edge 25. The core metal 31 is of a ringed member of the size, which may be accommodated in the case 21 together with the lubricant-containing member 27. The core metal 31 cooperates with the end wall 23 of the case 21 to hold securely the lubricant-containing member 27 therebetween. The rubber-made lip 32, as illustrated in FIG. 3, projects radially inwardly to the extent so as to cover at least the convexities 29, thereby making slide-engagement with the track shaft 2 to protect the interior of the slider 1 from the inversion of dust and debris deposited on the track shaft 2.

As shown in FIG. 2, both the lubricant-containing member 26 and the end seal 30 contained in the case 21 are kept from falling off the case 21 by means of a retaining ring 33, which is held in engagement with either of the annular holding edge 25 of the case 21 and the periphery of the core metal 31 of the end seal 30. The lubricating plate assembly 20 may be, as shown in FIGS. 1 to 3, handled, alone. The case 21 has not only the effective functions of keeping the lubricant-containing members 27 from the contamination of the dust and dirt, preventing the lubricant-containing member 27 from the breakage as well as the leakage of lubricating oil, but also the advantage of not having to touch the lubricant-containing member 27 impregnated with the lubricating oil, which might otherwise stain the hands of the service man who handles the lubricant- containing member 27.

Figure 6:
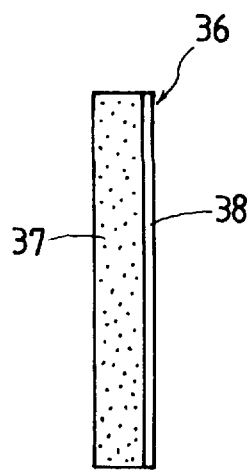
FIG. 6 is a side elevation showing another embodiment of a lubricant plate for the lubricating plate assembly of FIG. 1.

Referring to FIG. 6 illustrating a lubricant plate 36 according to another embodiment of the present invention, the lubricant plate 36 is composed of a lubricant-containing member 37 and a core metal 38 arranged along the lubricant-containing member 37. The core metal 38 may be provided thereon with pointed pins or claws, not shown, to pierce the lubricant-containing member 37, which is thus fixed to the core metal 38. The pins or claws may be formed by bending parts of the core metal, which have been stamped out from the core metal, or by implanting pins or claws, which have been prepared separately, in the core metal by, for example, welding. As an alternative, the lubricant-containing member may be adhered to the core metal with adhesives. Especially, the lubricant-containing member of the powdery ultrahigh molecular weight polyethylene resin may be easily adhered to the core metal 38 by using the adhesives of, for example, epoxy resin. The sintered resinous component is impregnated with the lubricant, preferably after having been adhered to the core metal 38.

The lubricant-containing member 37 is adhered to the core metal 38 at least at only areas neighboring the portions kept in slide-contact with the raceway grooves 4 of the track shaft 2, thereby reinforcing the lubricant-containing member 37 at the areas neighboring on the portions made in slide-contact with the raceway grooves 4 of the track shaft 2. On this design of local adhesion in which the lubricant-containing member 37 is adhered to the rigid core metal 38 at the area neighboring on the convexities 29, even if the lubricant-containing member 37 is subject to the external force great to cause its deformation, the core metal 38 resists the deformation of the convexities 29 to keep the accuracy of their sliding surfaces with respect to the raceway grooves 4. As a result, the convexities 29 of the lubricant-containing member 37 are kept from not only excessive pressing against the raceway grooves 4, but also separation away from the raceway grooves 4, thereby causing no increase of the sliding resistance to the raceway grooves 4. On finishing the lubricating plate assembly, in case where the lubricant plate 36 is contained in the case 21 with the core metal 38 on the side of the end wall 23, the lubricant-containing member 37 is arranged interposed between the core metal 38 and the core metal 31 of the end seal 30. As an alternative, the lubricant plate 36 may be installed such that its core metal 38 may substitute for the core metal 31 of the end seal 30.

Figure 7:
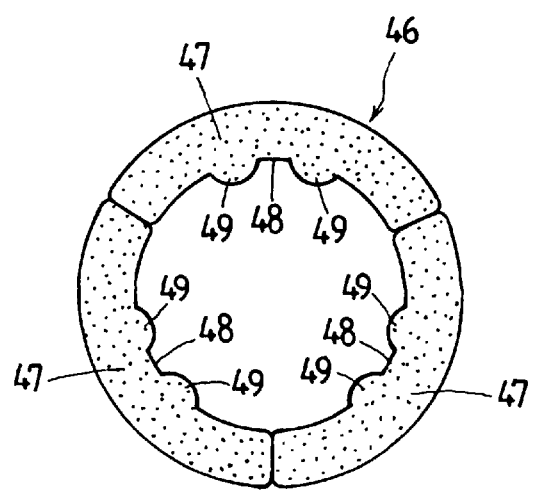
FIG. 7 is a front elevation showing a further another embodiment of a lubricant plate for the lubricating plate assembly of FIG. 1.

Next referring to FIG. 7 illustrating a lubricant plate 46 according to a further another embodiment of the present invention, the lubricant plate 46 is equally split into three annular sectors 47 of substantially arced contour, which are identical in shape so as to make a ring in combination with each other. Each lubricant plate sector 47 has on its arced inner surface a pair of convexities 49, which are arranged spaced so as to provide a recess 48 therebetween for any associated ridge 3 on the track shaft 2 and concurrently make slide-contact with the associated raceway grooves 4 in the opposite side of the recess 28, each convex to each raceway groove. Splitting the lubricant plate 46 as described just above makes it possible to replace any old lubricant plate sectors 47 to a new one, with the lubricating plate assembly being left fitted on the track shaft 2. Moreover, the lubricant plate 46 split in the sectors contributes to the reduction in size of the mould for forming the sintered resinous component, and thus is preferable for mass production thereof.

Figure 8:
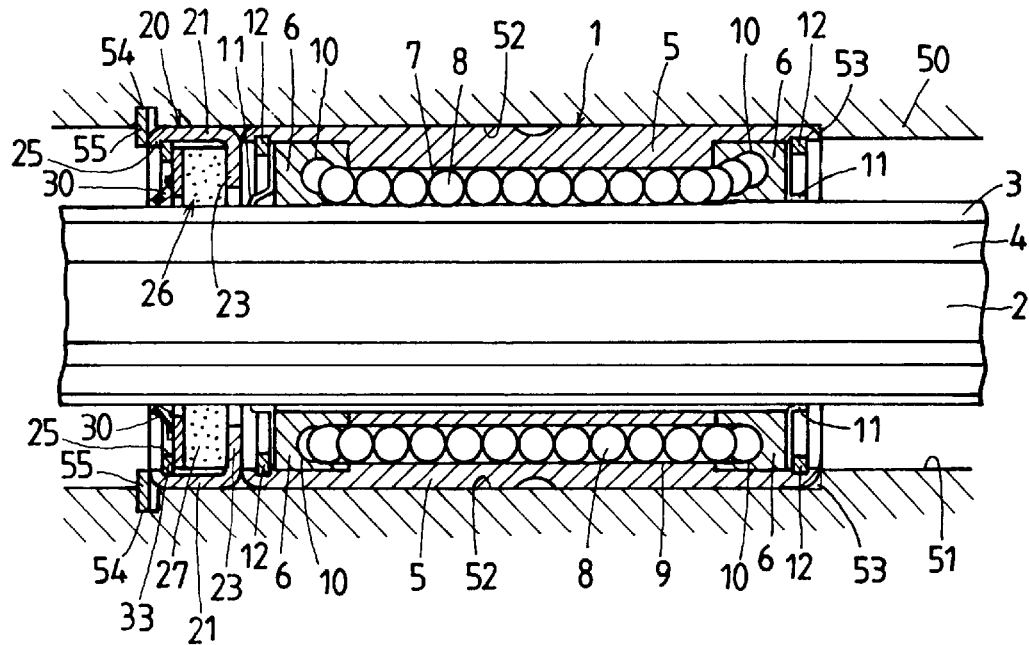
FIG. 8 is an axial sectional view showing a preferred embodiment of a linear motion guide unit having incorporated with the lubricating plate assembly shown in FIGS. 1 to 3.

The lubricating plate assembly 20 constructed as a completed component is used incorporated in a liner motion guide unit shown in FIG. 8, which is substantially identical in structure and function with the linear motion guide unit in FIG. 21, except for the employment of the lubricating plate assembly 20 and, therefore, like parts or components have been given the same reference characters, so that the previous description will be applicable. A housing 50 constitutes an instrument to be moved along the track shaft 2 and is formed therein with a bore 51, which is less in calibre, compared with a bore 52 for accommodating therein the linear motion guide unit. The slider 1, together with the track shaft 2 on which the slider 1 is mounted, is fitted into the bore 52 to a depth where its one end abuts against an annular shoulder 53. The lubricating plate assembly 20 is mounted on the track shaft 2 with the end wall 21 abutting against the other end of the slider 1. The bore 52 is slotted at 54, where a retaining ring 55 is engaged to hold the slider 1 and the lubricating plate assembly 20 against the shoulder 53. Thus, the retaining ring 55 engaged in the slot 54 makes an engagement with the lubricating plate assembly 20, thereby keeping the slider 1 and the lubricating plate assembly 20 from falling off the bore 52.

According to the embodiment as described just above, the slider 1 having mounted with the housing 50 of the instruments may move with respect to the track shaft 2 by virtue of the rolling elements 8 running through the load raceways, which are defined between the confronting raceway grooves 4, 7 of the track shaft 2 and the slider 1, respectively. On the other hand, the rubber lips 32 of the end seal 30 in the lubricating plate assembly 20 wipe clean and protect the slider 1 from the contamination of foreign matters such as dust and dirt. The lubricant-containing member 27 applies lubricant to the raceway grooves 4 on the track shaft 2. Moreover, the case 21 covers the outer peripheral surface of the lubricant-containing member 27, which is thus made unsusceptible to the breakage as well as the dusty atmosphere.

The lubricant-containing member 37 is adhered to the core metal 38 of high stiffness and, therefore, even if the lubricant-containing member 37 is subject to the external force great to cause its deformation, the core metal 38 resists the deformation of the member 37 to keep the accuracy of their sliding surfaces with respect to the raceway grooves 4. As a result, the convexities 29 of the lubricant-containing member 37 are kept from not only excessive pressing against the raceway grooves 4, but also separation away from the raceway grooves 4, thereby capable of incessantly supplying the sufficient lubricant to the raceway grooves 4 with no increase of the sliding resistance to the raceway grooves 4.

Figure 9:
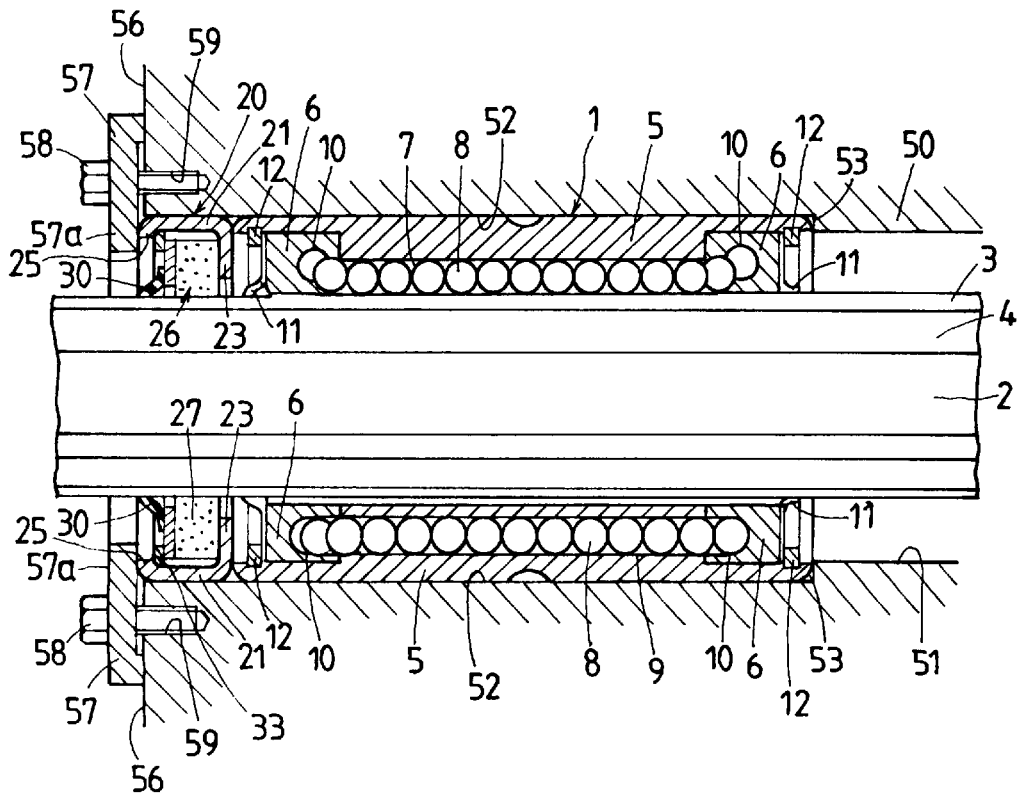
FIG. 9 is an axial sectional view showing another embodiment of a linear motion guide unit having incorporated with the lubricating plate assembly shown in FIGS. 1 to 3.
Figure 10:
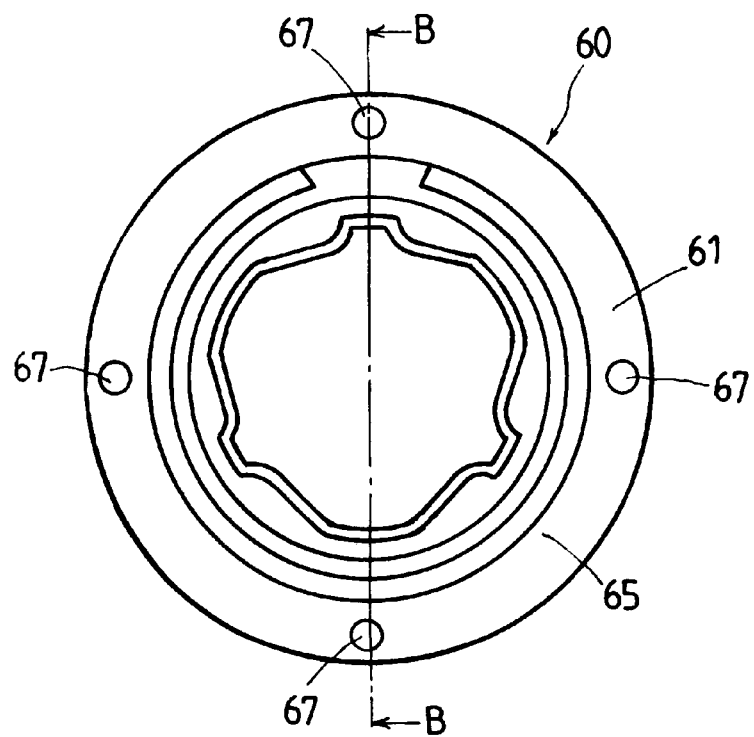
FIG. 10 is a front elevation showing another embodiment of a lubricating plate assembly.
Figure 11:
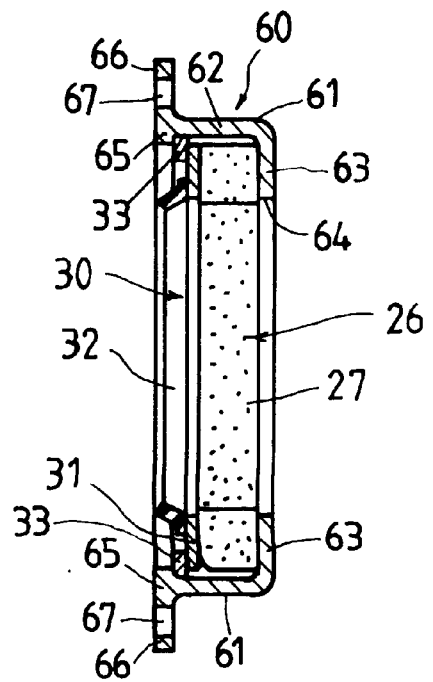
FIG. 11 is a cross section of the lubricating plate assembly of FIG. 10 and is taken on the plane of the line B—B of FIG. 10.
Figure 12:
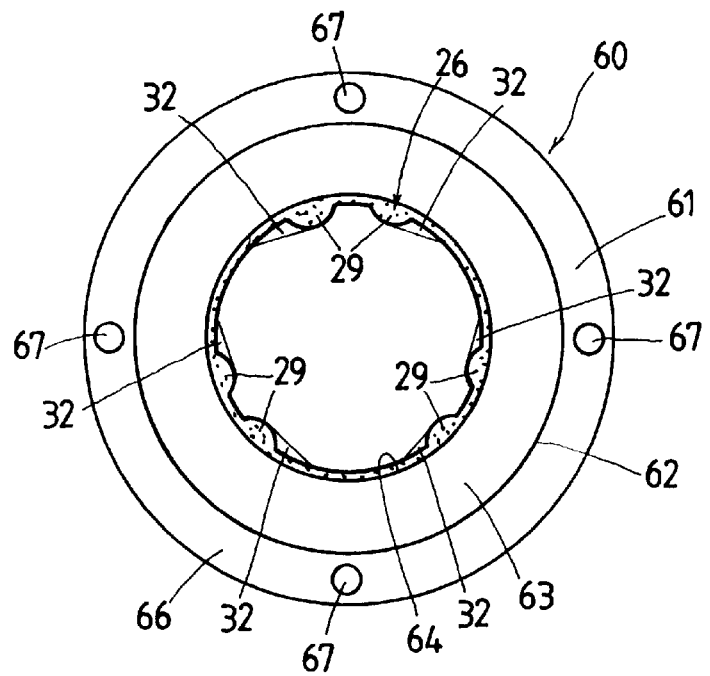
FIG. 12 is a back elevation of the lubricating plate assembly shown in FIG. 10.
Figure 13:
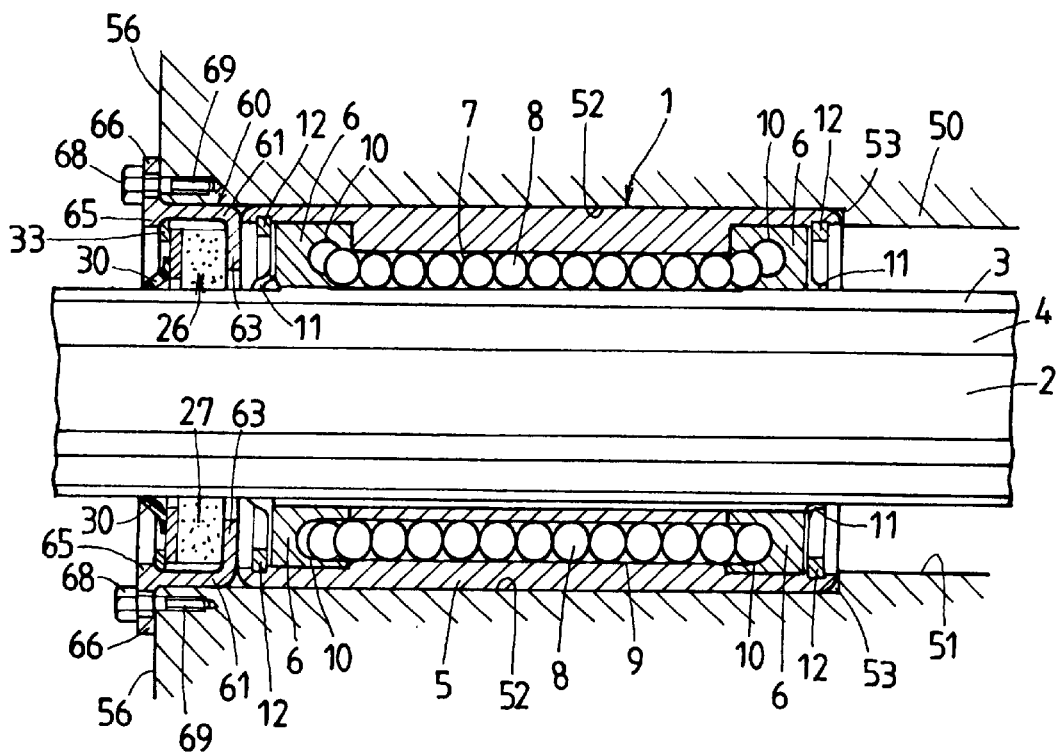
FIG. 13 is an axial sectional view showing a further another embodiment of a linear motion guide unit having incorporated with the lubricating plate assembly shown in FIGS. 10 to 12.
Figure 14:
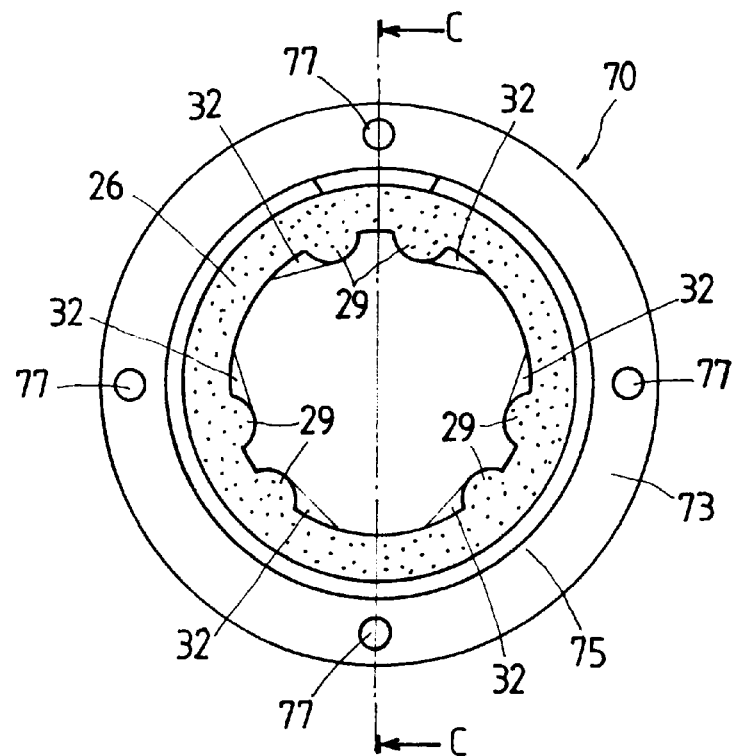
FIG. 14 is a front elevation showing a further another embodiment of a lubricating plate assembly for the linear motion guide unit according to the present invention.
Figure 15:
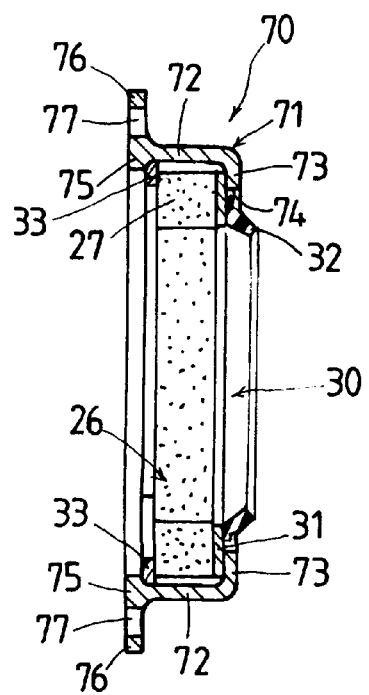
FIG. 15 is a cross section of the lubricating plate assembly of FIG. 14 and is taken on the plane of the line C—C of FIG. 10.
Figure 16:
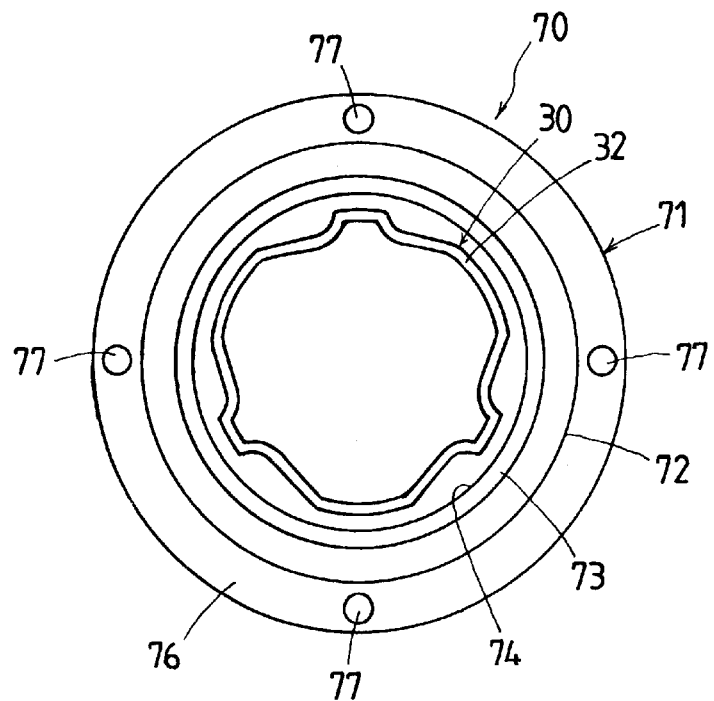
FIG. 16 is a back elevation of the lubricating plate assembly shown in FIG. 14.

Further referring to FIG. 9 illustrating another embodiment of the linear motion guide unit having incorporated with the lubricating plate assembly 20, the linear motion guide unit is mounted to the housing 50 by the use of retaining plate 57, which is held with bolts 58. The retaining plate 57 is attached to an end face 56 of the housing 50 by the use of the bolts 58 screwed into a matching hole 59 on the end face 56. The retaining plate 57 attached as described above abuts at 57a against the outer surface of the holding edge 25 of the case 21 thereby keeping the slider 1 and the lubricating plate assembly 20 from falling off the housing 50. Alignment in position of the holding edge 25 of the lubricating plate assembly 20 with the end face 56 may be secured with the aid of the design of the retaining plate 57, a spacer or the like.

A further another embodiment of the linear motion guide unit of the present invention will be explained below in conjunction with FIGS. 10 to 13. Compared with the embodiment in FIGS. 1 to 9, this embodiment is identical in structure, except for the structure of the case of the lubricating plate assembly and, therefore, like parts or components have been given the same reference characters, so that the previous description will be applicable.

The lubricating plate assembly 60 is comprised of a case 61 of a hollow cylindrical supporting member having an axial height less sufficiently compared with its diameter, the lubricant plate 26 contained in the case 21, and the end seal 30. The case 61 includes an outer peripheral wall 62, an annular end wall 63 extending radially inwardly from one margin of the outer peripheral wall 62 so as to define an aperture 64 for the track shaft 2, an annular holding edge 65 folded radially inwardly around the other margin of the outer peripheral wall 62, and an annular fitting flange 66 extending radially outwardly of the outer peripheral wall 62. The case 61 has therein a spatial area surrounded by the outer peripheral wall 22, to accommodate therein the lubricant plate 26. Although the case 21 may be fabricated of any one of metals, synthetic resins, synthetic rubbers or the like, it is preferably made of thin steel plate or synthetic resins as with the case 21.

The fitting flange 66 of the case 61 is provided therein with holes 67 for bolts 68 to fix the case 61 to the housing 50 of the instruments. As apparent from FIG. 13, the housing 50 is formed on the end face 56 thereof with matching holes 69 in alignment with the holes 67, into which the bolts 68 are screwed to connect the case 61 onto the housing 50 of the instrument, thereby keeping the lubricating plate assembly 60 and the slider 1 from falling off the housing 50.

A further another embodiment of the linear motion guide unit of the present invention will be hereinafter with reference to FIGS. 14 to 17. A lubricating plate assembly in FIGS. 14 to 17 is identical in structure with the embodiment described above in conjunction with FIGS. 10 to 13, with the exception of a lubricating plate assembly 70 being attached to a slider 80, and thus like parts or components have been given the same reference characters, so that the previous description will be applicable.

The lubricating plate assembly 70 is comprised of a case 71 of a hollow cylindrical supporting member having an axial height less sufficiently compared with its diameter, the lubricant plate 26 contained in the case 71, and the end seal 30. The case 71 includes an outer peripheral wall 72, an annular end wall 73 extending radially inwardly from one margin of the outer peripheral wall 72 in the side of the end seal 30 so as to define an aperture 74 unobstructive to the track shaft 2 as well as the rubber lips 32 of the end seal 30, and an annular fitting flange 76 extending radially outwardly of the outer peripheral wall 72. The case 71 has therein a spatial area surrounded by the outer peripheral wall 72, to accommodate therein the lubricant plate 26. Although the case 71 may be fabricated of any one of metals, synthetic resins, synthetic rubbers or the like, it is preferably made of thin steel plate or synthetic resins as with the case 21.

Figure 17:
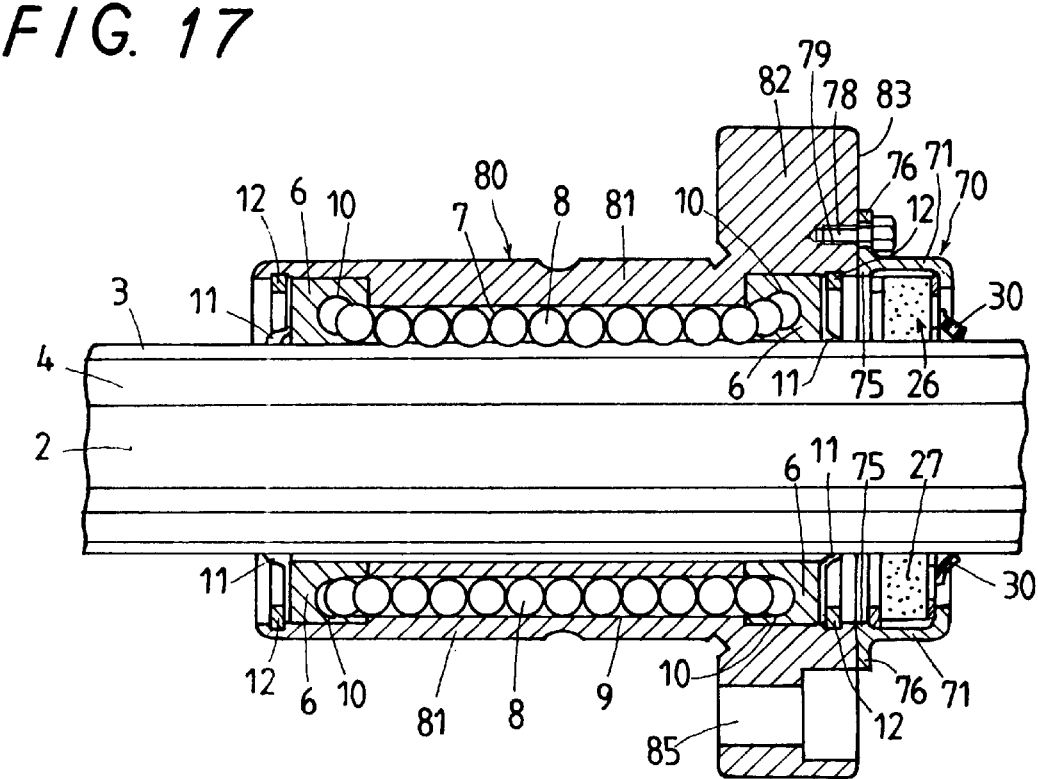
FIG. 17 is an axial sectional view showing a further another embodiment of a linear motion guide unit having incorporated with the lubricating plate assembly shown in FIGS. 14 to 16.

The lubricating plate assembly 70, as shown in FIG. 17, is attached to a mating flange 82 formed on any one side of a casing 81 of the slider 80. The slider 80 is identical with the slider 1 in FIGS. 8, 9, 13 and 15, except that the casing 81 differs in structure from the casing 5. The case 71 of the lubricating plate assembly 70 has at the fitting flange 76 thereof holes 77 for bolts 68, while the casing 81 is formed on the end face 83 thereof with matching holes 79 in alignment with the holes 77. Thus, the case 71 is attached to the slider 80 by means of the bolts, which extend through holes 77 in the fitting flange 76 of the case 71 and are screwed into the matching holes 79 opening on the mating flange 82 of the casing 81. As a result, both the case 71 and the slider 81 may be handled in unison. Provided in the flange 82 of the casing 81 are holes 85 for fitting bolts to mount the housing, not shown, of the associated instrument to the slider 80, which are positioned in order not to interfere with the lubricating plate assembly 70. Thus, the lubricating plate assembly 70 and the slider 1 are mounted as an unit to the housing of the instrument by the bolts, not shown, which are screwed into the housing, extending through any associated hole 85.

Figure 18:
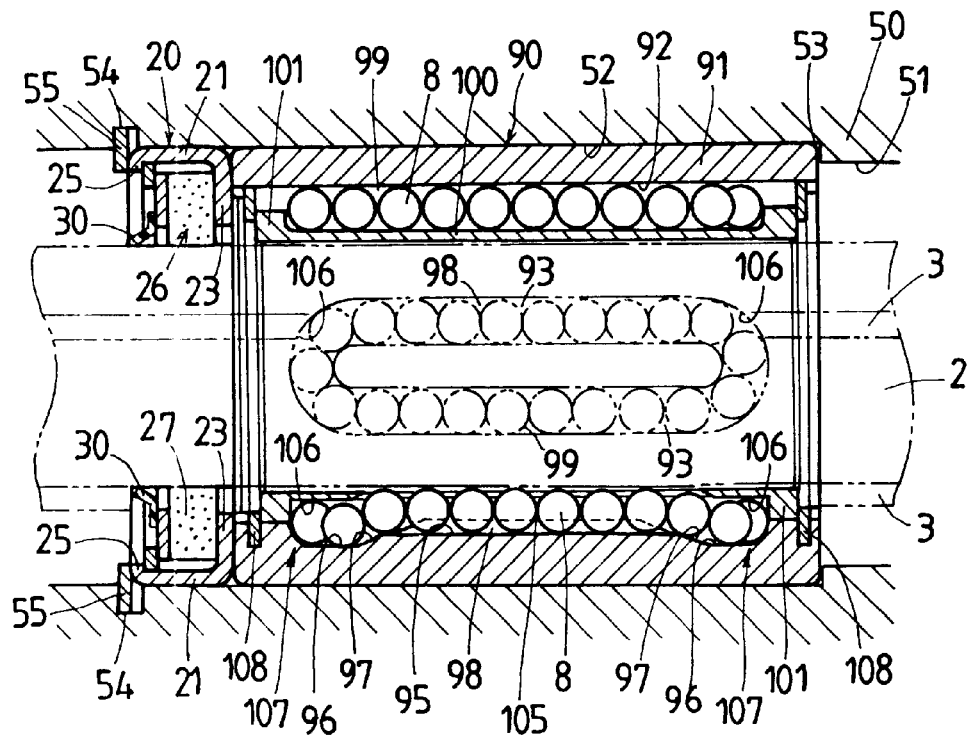
FIG. 18 is an axial sectional view showing a further another embodiment of a linear motion guide unit having incorporated with the lubricating plate assembly shown in FIGS. 1 to 3.
Figure 19:
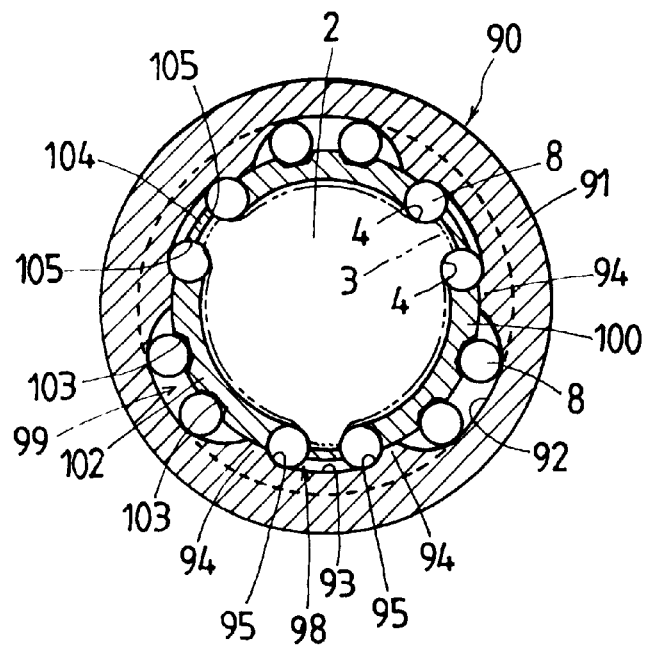
FIG. 19 is a cross section of the linear motion guide unit in FIG. 18.
Figure 20:
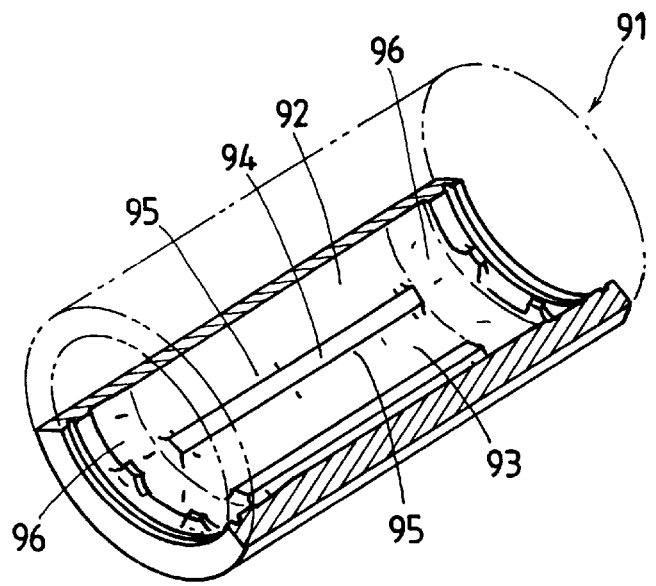
FIG. 20 is a broken view in perspective of a casing employed in the linear motion guide unit shown in FIG. 18.

Finally, referring to FIGS. 18 to 20, the following will explain a further another embodiment of the present invention, in which the lubricating plate assembly in FIGS. 1 to 3 is incorporated.

A slider 90 is composed of a casing 91 and a ball retainer 100. The casing 91 is provided on an inner peripheral surface thereof with deep non-loaded raceway grooves 92 and shallow load raceway grooves 93, which are arranged alternately each other and spaced away circumferentially from each other. Raised zones 94 extending lengthwise the casing 91 each separate any adjoining non-loaded and load raceway grooves 92, 93 from one another. On a raised strip of the raised zone 94 in the side of the associated load raceway groove 93, there is provided a runway groove 95, or a second raceway groove, confronting the associated raceway groove 4, or a first raceway groove, on the track shaft 2 to thereby define a raceway for allowing the rolling element, or balls 8, to run therethrough. Thus, the raceway grooves 4 on the track shaft 2 and the runway grooves 95 in the casing 91, in combination, constitute the load raceways 98. Provided at the lengthwise opposing ends of the casing 91 are turnarounds permitting the balls 8 to circulate from the non-loaded raceway grooves 92 to the load raceway grooves 93 and vice versa. The turnarounds include circumferential grooves 96, and sloping grooves 97 connecting the circumferential grooves 96 to either of the non-loaded and load raceway grooves 92, 93.

The retainer 100 for holding the balls 8 is arranged in an annular clearance provided between the casing 91 and the track shaft 2. The ball retainer 100 is made in engagement at its lengthwise opposing ends 101 with stopper rings 99 connected to the casing 91, which are to keep the ball retainer 100 from falling off the casing 91. The ball retainer 100 includes thick areas 102 opposite to the non-loaded raceway grooves 92, and thin areas 104 opposite to the load raceway grooves 93, which are arranged alternately each other. The thick areas 102 are provided with non- loaded raceway grooves 103 confronting the non-loaded raceway grooves 92. Boundaries between the thick area 102 and thin areas 104 are each formed with a slot 105, which is made somewhat less in size than the ball 8 so as to protect the ball 8 from falling off the associated raceway. The confronting non-loaded raceway grooves 92, 103 on the casing 91 and the ball retainer 100, in combination, provide return passages 99 for endless-circulation of the balls. Formed at the lengthwise opposing ends of the slots 105 in opposition to the circumferential grooves 96 are turnaround grooves 106 connected to the non-loaded raceway grooves 103 in the thick areas 102. Thus, the circumferential grooves 96 and the turnaround grooves 103, in combination, constitute turnaround passageways 107, through which the balls 8 may turn about between the load raceways 98 and the return passageways 99.

As shown in FIG. 18, the linear motion guide unit of the present invention may be combined with the slider in which the balls 8 run along the ball retainer 100. It is to be noted that the previous description in conjunction with FIG. 8 is applicable to the structures of the lubricating plate assembly 20 and the housing 50 as well as the mounting system of the lubricating plate assembly 20 onto the housing 50.

Although the embodiments described above are shown provided for the ball-spline type having the track shaft 2 with raceway grooves 4 thereon, they may of course be applied with equal utility to the linear motion guide unit having the round shaft with no raceway grooves thereon.

Having described the lubricating plate assembly 20, 60, 70 arranged on only one end of the slider 1, 80, 90, it is believed obvious they may be attached on both the lengthwise opposing ends of the slider.

Mounting the set of slider 1, 80, 90 and lubricating plate assembly 20, 60, 70 onto the other instruments has been described in conjunction with the structure of fitting the set of slider 1, 80, 90 and lubricating plate assembly 20, 60, 70 into the bore with the shoulder 53 therein, but is not limited to such structure and may be carried out in the other structure in which the set of slider and lubricating plate assembly is fitted into a bore with no shoulder or step, and kept from falling off the bore by the use of retaining rings, retainer plates or the like, which are arranged at the axially opposing open ends of the bore.

While the present invention has been described in its preferred embodiments, it is to be understood that the words which have been used are words of description rather than limitation and that changes within the purview of the appended claims may be made without departing from the true scope and spirit of the invention in its broader aspect.

What is claimed is:

1. A linear motion guide unit comprising an elongated track shaft of solid cylinder, a slider having a casing and surrounding around the track shaft for sliding movement along the track shaft, and at least one lubricating plate assembly arranged at least any one of lengthwise opposing ends of the casing of the slider for sliding movement on the track shaft, wherein the lubricating plate assembly includes therein a lubricant plate of sintered resinous component having porous structure impregnated with lubricant, an end seal arranged on the lubricant plate in a side opposite to the casing so as to slide along the track shaft, and a case containing therein both the lubricant plate and the end seal.

2. A linear motion guide unit constructed as defined in claim 1, wherein the lubricant plate is composed of a lubricant-containing member of the sintered resinous component, and a core metal fixed to the lubricant-containing member.

3. A linear motion guide unit constructed as defined in claim 1, wherein rolling elements are arranged between first raceway grooves formed lengthwise on the track shaft and second raceway grooves formed in the casing, confronting the first raceway grooves.

4. A linear motion guide unit constructed as defined in claim 3, wherein the slider is provided with end caps mounted on lengthwise opposing ends of the casing, each to each end, the casing is formed therein with return passageways for the rolling elements, and the end caps are provided therein with turnarounds where the rolling elements are permitted turning around from load raceways defined between the confronting first and second raceway grooves to the return passageways and vice versa.

5. A linear motion guide unit constructed as defined in claim 3, wherein the casing has a retainer for holding the rolling elements for free running through the load raceways defined between the confronting first and second raceway grooves, and return passageways and turnarounds for the rolling elements are formed between the casing and the retainer.

6. A linear motion guide unit constructed as defined in claim 3, wherein the lubricant plate moves along the track shaft, with keeping a slide-contact with at least the first raceway grooves on the track shaft.

7. A linear motion guide unit constructed as defined in claim 6, wherein the lubricant plate is composed of a lubricant-containing member and a core metal fixed to the lubricant-containing member, and wherein the lubricant-containing member is adhered to the core metal at least at local areas neighboring its portions which are brought into slide-contact with the first raceway grooves on the track shaft.

8. A linear motion guide unit constructed as defined in claim 1, wherein the lubricant plate includes the lubricant-containing member that is split at angular intervals around the track shaft into sectors of the lubricant-containing member.

9. A linear motion guide unit constructed as defined in claim 1, wherein the case of the lubricating plate assembly includes an outer peripheral wall for providing a spatial area to accommodate therein a lubricant plate and the end seal, an end wall extending radially inwardly from one margin of the outer peripheral wall so as to keep both the lubricant plate and the end seal from falling off the margin of the outer peripheral wall and also defining an aperture for the track shaft, and an holding edge provided around the other margin of the outer peripheral wall for keeping both the lubricant plate and the end seal from falling off the spatial area.

10. A linear motion guide unit constructed as defined in claim 9, wherein a means cooperating with the holding edge in keeping both the lubricant plate and the end seal from falling off is of a retaining ring fitted into the case.

11. A linear motion guide unit constructed as defined in claim 1, wherein the case is made of any one selected from metals, synthetic resins and synthetic rubber.

12. A linear motion guide unit constructed as defined in claim 1, wherein any one of auxiliary end seal and end plate is arranged to the end of the casing, where the lubricating plate assembly is disposed.

13. A linear motion guide unit constructed as defined in claim 1, which is adapted to an instrument having components movable relatively of each other, in such a manner that the track shaft is attached to any one of the components of the instrument while at least the slider is fitted in a bore in the other component of the instrument against falling off the bore.

14. A linear motion guide unit constructed as defined in claim 13, wherein the lubricating plate assembly is fitted in the bore near an open end of the bore, and the retaining ring is engaged in a slot formed in the bore to make an engagement with the end of the case of the lubricating plate assembly whereby both the slider and the lubricating plate assembly are kept from falling off the bore.

15. A linear motion guide unit constructed as defined in claim 13, wherein the lubricating plate assembly is fitted in the bore near the open end of the bore, and the retainer plate is engaged with an end face of the other component of the instrument to make an engagement with the end of the case of the lubricating plate assembly whereby both the slider and the lubricating plate assembly are kept from falling off the bore.

16. A linear motion guide unit constructed as defined in claim 13, wherein the lubricating plate assembly is fitted in the bore near the open end of the bore, and the case is provided with a fitting flange extended radially outwardly of the case, the fitting flange being attached onto an end face of the other component of the instrument to keep both the slider and the lubricating plate assembly from falling off the bore.

17. A linear motion guide unit constructed as defined in claim 13, wherein the lubricating plate assembly is mounted to the slider, which is in turn attached to the other component of the instrument thereby been kept from falling off the bore.

18. A linear motion guide unit constructed as defined in claim 1, wherein the sintered resinous component is fabricated by heating finely powdered synthetic resin under pressure in a design mould.

* * * * *